United States Patent
Kodama et al.

(10) Patent No.: US 6,782,969 B2
(45) Date of Patent: Aug. 31, 2004

(54) VEHICLE STEERING CONTROL SYSTEM

(75) Inventors: Kazumasa Kodama, Toyota (JP); Masahiro Miyata, Kariya (JP)

(73) Assignees: Toyoda Koki Kabushiki Kaisha, Kariya (JP); Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 10/626,591

(22) Filed: Jul. 25, 2003

(65) Prior Publication Data

US 2004/0129490 A1 Jul. 8, 2004

(30) Foreign Application Priority Data

Jul. 26, 2002 (JP) ........................................ 2002-217521

(51) Int. Cl.[7] .............................................. B62D 5/99
(52) U.S. Cl. ........................... 180/446; 701/41; 701/42; 180/421; 180/422
(58) Field of Search ................................ 180/446, 402, 180/403, 421, 422; 701/41–43

(56) References Cited

U.S. PATENT DOCUMENTS 5,307,892 A * 5/1994 Phillips ...................... 180/422
5,448,482 A * 9/1995 Yamamoto et al. ........... 701/41
6,018,691 A * 1/2000 Yamamoto et al. ........... 701/41

FOREIGN PATENT DOCUMENTS

JP  11-334604  12/1999
JP  11-334628  12/1999

* cited by examiner

Primary Examiner—Lesley D. Morris
Assistant Examiner—L. Lum
(74) Attorney, Agent, or Firm—Oblon, Spivak, McClelland, Maier & Neustadt, P.C.

(57) ABSTRACT

A vehicle steering control system is provided which is capable of reliably protecting a motor for driving a wheel steering shaft. The offset output characteristic of a current sensor for detecting the electric current applied to the steering shaft drive motor is actually measured prior to the actual use of the steering control system, and offset compensation information is prepared based on the measured value of the offset output characteristic for storage in an EEPROM. Further, an output value of the current sensor and an output value of a reference current measuring system are measured independently of each other with the supply voltage for use in measurement being set to a constant value. Then, current gain compensation information is prepared based on the output values so measured and is stored in the EEPROM. In the later actual use (i.e., after shipment) of the control system, the output of the current sensor is compensated based on the offset compensation information and the current gain compensation information.

7 Claims, 12 Drawing Sheets

$$E_{OX} = G_0 \cdot (V_X - V_2) + E_{02}$$
$$C = E_{02} - G_0 \cdot V_2$$

130

| Vehicle Speed (V) | $V_1$ | $V_2$ | $V_3$ | ....... | $V_n$ |
|---|---|---|---|---|---|
| Steering Angle Conversion Ratio (α) | $\alpha_1$ | $\alpha_2$ | $\alpha_3$ | ....... | $\alpha_n$ |

$\alpha = \theta / \varphi$  $\varphi$ : Handle Shaft Angular Position $\theta$ : Steering Shaft Angular Position

| Vs / Δθ | Vs₁ | Vs₂ | Vs₃ | Vs₄ | ... | Vsₙ |
|---|---|---|---|---|---|---|
| $\Delta\theta_1$ | $\eta_{11}$ | $\eta_{12}$ | $\eta_{13}$ | $\eta_{14}$ | ... | $\eta_{1n}$ |
| $\Delta\theta_2$ | $\eta_{21}$ | $\eta_{22}$ | $\eta_{23}$ | $\eta_{24}$ | ... | $\eta_{2n}$ |
| $\Delta\theta_3$ | $\eta_{31}$ | $\eta_{32}$ | $\eta_{33}$ | $\eta_{34}$ | ... | $\eta_{3n}$ |
| $\Delta\theta_4$ | $\eta_{41}$ | $\eta_{42}$ | $\eta_{43}$ | $\eta_{44}$ | ... | $\eta_{4n}$ |
| ⋮ | ⋮ | ⋮ | ⋮ | ⋮ | ⋮ | ⋮ |
| $\Delta\theta_m$ | $\eta_{m1}$ | $\eta_{m2}$ | $\eta_{m3}$ | $\eta_{m4}$ | ... | $\eta_{mn}$ |

$\eta$ : Duty Ratio $\Delta\theta = \theta' - \theta$ $\theta'$ : Target Steering Shaft Angular Position
$\theta$ : Present Steering Shaft Angular Position

VEHICLE STEERING CONTROL SYSTEM

INCORPORATION BY REFERENCE

This application is based on and claims priority under 35 U.S.C. sctn. 119 with respect to Japanese Application No. 2002-217521 filed on Jul. 26, 2002, the entire content of which is incorporated herein by reference.

BACKGROUND OF THE INVENTION

1. Field of the Invention

The present invention relates to a steering control system for a motor vehicle such as, for example, a motorcar.

2. Discussion of the Related Art

In the field of steering devices for vehicles and especially, in the field of steering devices for motorcars, for higher performance, there has recently been developed a system incorporating a so-called "variable steering angle ratio converting mechanism" which is capable of varying the conversion ratio of a handle steering angle to a wheel steering angle (steering conversion ratio) in dependence on the traveling state of the vehicle without keeping the manipulation angle of a steering handle (handle manipulation angle) and a wheel steering angle fixed at a one-to-one ratio. For example, the vehicle speed can be exemplified as representing the vehicle traveling state, and in the system, the stability in a high speed traveling can be ensured by making the steering conversion ratio small so that the steering angle does not increase sharply with increase in the handle manipulation angle during the high speed traveling. During a slow speed traveling, on the contrary, the steering conversion ratio is made larger so that the number of rotations needed to make a full turn of the handle is decreased. This advantageously makes it possible that the manipulation with a large steering angle as required for, e.g., garaging, in-line parking, pulling-over to the kerb or the like can be performed very easily.

For example, as disclosed in Japanese unexamined, published patent application No. 11-334604(1999-334604), a mechanism for changing the steering conversion ratio is constituted by directly connecting a handle shaft and a wheel steering shaft with a gear type transmission unit whose gear ratio is variable. However, this type of the mechanism involves a drawback that the gear ratio changing mechanism of the gear type transmission unit is complicated in construction. Another type of the mechanism has been proposed in, for example, Japanese unexamined, published patent application No. 11-334628 (1999-334628), wherein a wheel steering shaft is rotationally driven by a motor. More specifically, a wheel steering angle finally needed is calculated through a computer processing based on a steering conversion ratio which is determined in dependence on a handle manipulation angle detected by an angle detection section and the traveling state of the vehicle, and the wheel steering shaft is rotationally driven by the motor with the handle shaft being disconnected mechanically therefrom thereby to bring the wheel steering angle into coincidence with that calculated.

In the foregoing steering control method, the frequency in operation of the motor for rotationally driving the wheel steering shaft increases very high due to the frequent handle manipulations performed during the driving of the vehicle. Accordingly, in improving the maintenance capability of the motorcar practicing the control method of this kind, it is important to ensure that the motor can operate stably over a long period of time. For example, motors tend to deteriorate their performances when operated for a long time in such a state that an excess current or overcurrent is applied thereto due to an overload or the like. Therefore, it becomes effective to use the motor under a moderate protection by monitoring the current value applied to the motor by means of a current sensor and by restraining the electric current to the motor when the state of overcurrent is detected.

As the current sensor, there have been in popular use those of the type that a current detection resistance is provided on a path for electric current to detect a voltage across the resistance by a differential amplifier circuit. The differential amplifier circuit has a characteristic that it has an offset output of a certain level even when the differential voltage input thereto is zero. The problem is that the offset output is not definite or fixed, but rather disperses among the products due to the difference in circuit constants of the products. Further, the gain of a detected current output against the level of an input differential voltage is also an important parameter influencing the measuring accuracy of the current sensor, because it disperses among the products due to the difference in circuit characteristic. In particular, where ICs for operational amplifier are incorporated into the circuit configuration, the aforementioned problem tends to occur because the dispersion in the IC characteristic is relatively large among the products.

Where the dispersion in the offset or gain of a current detection output from the current sensor gives rise to the problems as mentioned above, it has been practice to harmonize the respective characteristics of the products with one another by adding parts such as resistances, condensers and the like around the differential amplifier circuit. However, this practice is very laborious in adding the parts as well as in doing adjustment and leads a higher manufacturing cost in consequence.

SUMMARY OF THE INVENTION

Accordingly, it is a primary object of the present invention to provide an improved vehicle steering control system capable of reliably detecting the overcurrent of a drive motor by the use of a current sensor without being influenced by the dispersion in output characteristic of such current sensors as used each for the system, so that the drive motor for driving a wheel steering shaft can be protected reliably.

Briefly, according to the present invention, there is provided a vehicle steering control system of the type wherein a steering angle to be given to a wheel steering shaft is determined in dependence on a steering angle given to a handle shaft for steering operation and the driving state of a vehicle so that the wheel steering shaft is rotationally driven by a steering shaft drive motor to be given the determined steering angle. The control system comprises a current sensor including a current detection resistance provided on a motor power supply path leading from an vehicle-mounted battery to a driver for the steering shaft drive motor for detecting a current applied to the steering shaft drive motor and a differential amplifier circuit for outputting a voltage across the current detection resistance as a current detection signal. The control system further comprises offset compensation information storage means for storing offset compensation information used in offset-compensating the output of the current sensor, the offset compensation information being prepared based on a measuring value which is obtained, in advance of the actual use of the system, by measuring an offset output generated by the differential amplification circuit when the voltage across the current detection resistance is zero; and offset compensation means for compensating the output of the current sensor based on the offset compensation information during the actual use of the system.

With this construction, the offset output characteristic of the current sensor for detecting the electric current applied to the steering shaft drive motor is measured prior to the actual use or incorporation into the vehicle steering control system (i.e., prior to the shipment of the control system), and offset compensation information is prepared based on the measured values to be stored in memory means (e.g., a ROM capable of performing write-in operation at least once, such as PROM (Programmable ROM)). Then, during the actual use (i.e., after shipment), the output of the current sensor is compensated for the offset compensation information. As a result, the manufacturing cost of the control system can be reduced because it becomes unnecessary to individually adjust the circuit coefficients of differential amplifier circuits used in such systems for offset adjustment and to add parts for adjustment to each of such control systems. Further, since the offset compensation information is prepared by actually measuring the offset level for each of the control systems to be shipped, the output of the current sensor having been so compensated is highly precise. For the reasons above, the influences caused by the product-by-product dispersion in output characteristic among the current sensors can be relived effectively, and thus, it can be achieved to reliably detect the overcurrent or the like by the use of the current sensor, so that the motor for driving the wheel steering shaft can be protected reliably.

In another aspect of the present invention, there is provided a vehicle steering control system of the type wherein a steering angle to be given to a wheel steering shaft is determined in dependence on a steering angle given to a handle shaft for steering operation and the driving state of a vehicle so that the wheel steering shaft is rotationally driven by a steering shaft drive motor to be given the determined steering angle. The control system comprises a current sensor including a current detection resistance provided on a motor power supply path leading from a vehicle-mounted battery to a driver for the steering shaft drive motor for detecting a current applied to the steering shaft drive motor and a differential amplification circuit for outputting a voltage across the current detection resistance as a current detection signal. The control system further comprises current gain compensation information storage means for storing current gain compensation information which is determined using a group of the output value of the current sensor and the output value of a reference current measuring system, the both of the output values being measured in advance of the actual use of the system by applying a voltage from a predetermined measuring power supply on the current detection resistance; and current compensation means for compensating the output of the current sensor based on the current gain compensation information during the actual use of the system.

It might be the case that the differential amplifier circuit for compensating the current sensor causes the gain of a current detection output against an input differential voltage level to disperse among the products due to the dispersion in circuit characteristic of the products. To obviate this drawback, in this aspect of the present invention, prior to the actual use of the system, the measuring power supply voltage is set to a constant value, in which state the output value of the current sensor and the output value of the reference current measuring system are measured independently of each other. By this measurement, it can be grasped how much rate the output value of the current sensor has gone wrong, due to the influence of the foregoing gain dispersion, with respect to the output of the reference current measuring system which has a higher preciseness in current detection. Therefore, the current gain compensation information is prepared based on the two measured outputs. During the actual use thereafter, the output of the current sensor is compensated based on the current gain compensation information. As a result, the manufacturing cost of the control system can be reduced because it becomes unnecessary to individually adjust the circuit coefficients of differential amplifier circuits used in such systems for offset adjustment and to add parts for adjustment to each of such control systems. Further, since the offset compensation information is prepared by actually measuring the offset level for each of the control systems to be shipped, the output of the current sensor having been so compensated is highly precise. For the reasons above, the influences caused by the product-by-product dispersion in output characteristic among the current sensors can be relieved effectively, and it can therefore be achieved to reliably detect the overcurrent or the like by the use of the current sensor, so that the motor for driving the wheel steering shaft can be protected reliably.

BRIEF DESCRIPTION OF THE ACCOMPANYING DRAWINGS

The foregoing and other objects and many of the attendant advantages of the present invention may readily be appreciated as the same becomes better understood by reference to the preferred embodiment of the present invention when considered in connection with the accompanying drawings, wherein like reference numerals designate the same or corresponding parts throughout several views, and in which:

FIG. 11 is an explanatory view showing a two-dimensional table for use in determining a duty ratio in dependence upon a power supply voltage to a motor and an angular difference ($\Delta\theta$);

DETAILED DESCRIPTION OF THE PREFERRED EMBODIMENT

Figure 1:
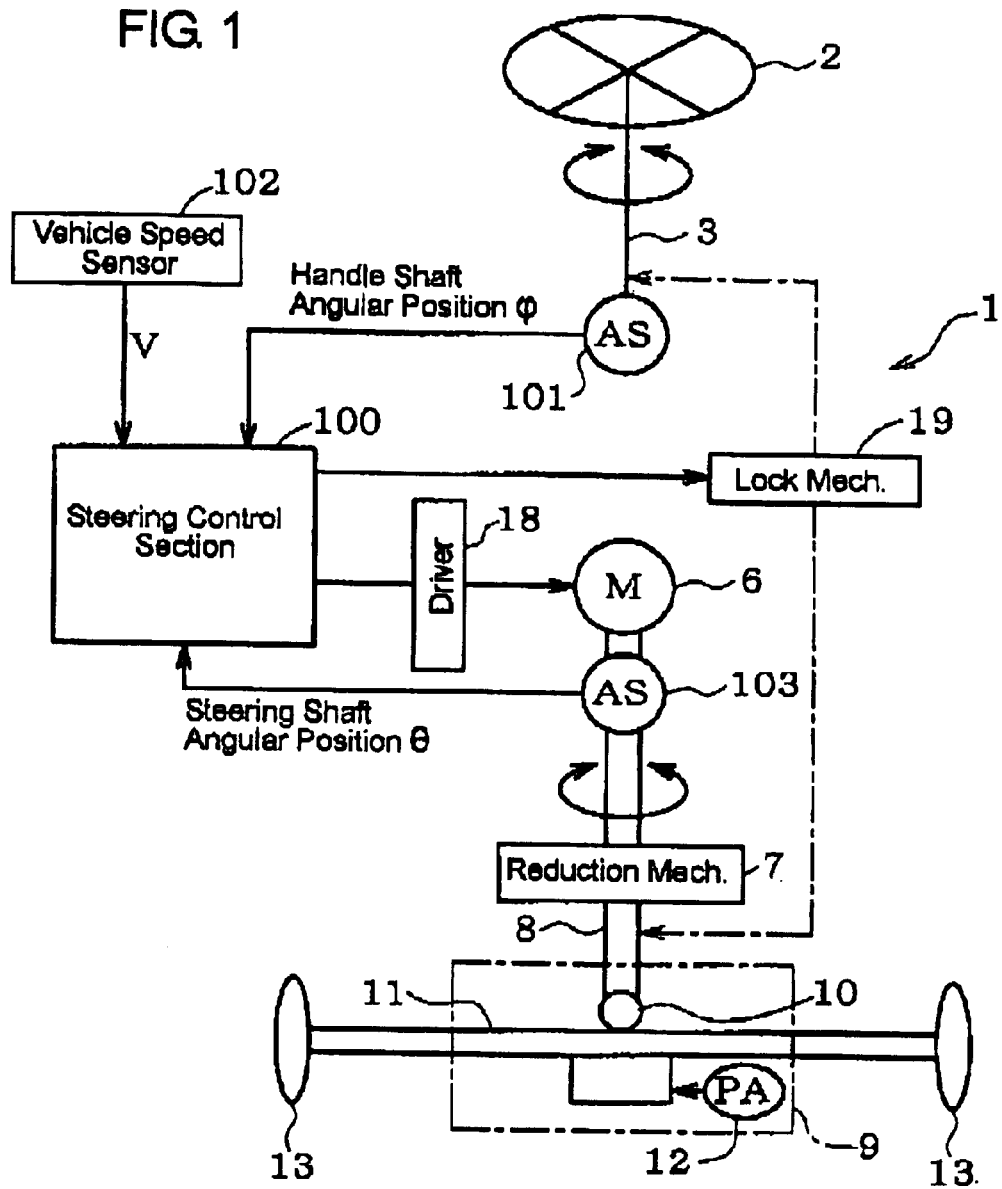
FIG. 1 is a schematic view showing the general construction of a vehicle steering control system in the embodiment according to the present invention.

Hereafter, an embodiment of the present invention will be described with reference to the accompanying drawings. FIG. 1 schematically shows one example of the general configuration of a vehicle steering control system to which the present invention is applied. Herein, the term "vehicle" means a motorcar or automobile, but it is to be noted that the subject to which the present invention is applied is not limited to the motorcar or automobile. A vehicle steering control system 1 takes the configuration that a handle shaft 3 in direct connection with a steering handle 2 is separated mechanically from a wheel steering shaft 8. The wheel steering shaft 8 is rotationally driven by a steering shaft drive motor (hereafter simply as "motor") 6. The wheel steering shaft 8 extends into a steering gear box 9, and a pinion 10 rotatable bodily with the wheel steering shaft 8 operates to reciprocally move a rack bar 11 in the axial direction thereof thereby to vary the steered angle of wheels 13, 13. In the vehicle steering control system 1 of the embodiment, there is employed a power steering device of the type that the reciprocation movement of the rack bar 11 is power-assisted by a well-known power assist mechanism of hydraulic type, electric type or electric-hydraulic type.

The angular position ψ of the handle shaft 3 is detected by a handle shaft angle detection section 101 composed of a well-known angle detection section such as a rotary encoder. On the other hand, the angular position (θ) of the wheel steering shaft 8 is detected by a steering shaft angle detection section 103 composed of a well-known angle detection section such as a rotary encoder likewise. In the present embodiment, a vehicle speed detection section (vehicle speed sensor) 102 for detecting the vehicle speed (V) is provided as a driving state detection section for detecting the driving state of the vehicle. The vehicle speed detection section 102 is constituted by a rotation detection section (e.g., rotary encoder or tachogenerator) for detecting the rotational speed of the wheels 13 for example. A steering control section 100 determines a target angular position (θ') of the wheel steering shaft 8 based on the detected angular position ψ of the handle shaft 3 and the detected vehicle speed (V) and controls the operation of the motor 6 through a motor driver 18 so that the angular position (θ) of the wheel steering shaft 8 comes close to the target angular position (θ').

Between the handle shaft 3 and the wheel steering shaft 8, there is provided a lock mechanism 19 which is switchable between a lock state that the both shafts are locked to be rotated bodily and an unlock state that the locking connection is released. In the lock state, the rotational angle of the handle shaft 3 is transmitted to the wheel steering shaft 8 without being converted, that is, at a one-to-one steering conversion ratio, so that manual steering is established. The switching-over of the lock mechanism 19 to the lock state is effected by an instruction from the steering control section 100 at the occurrence of an abnormality or the like.

Figure 2:
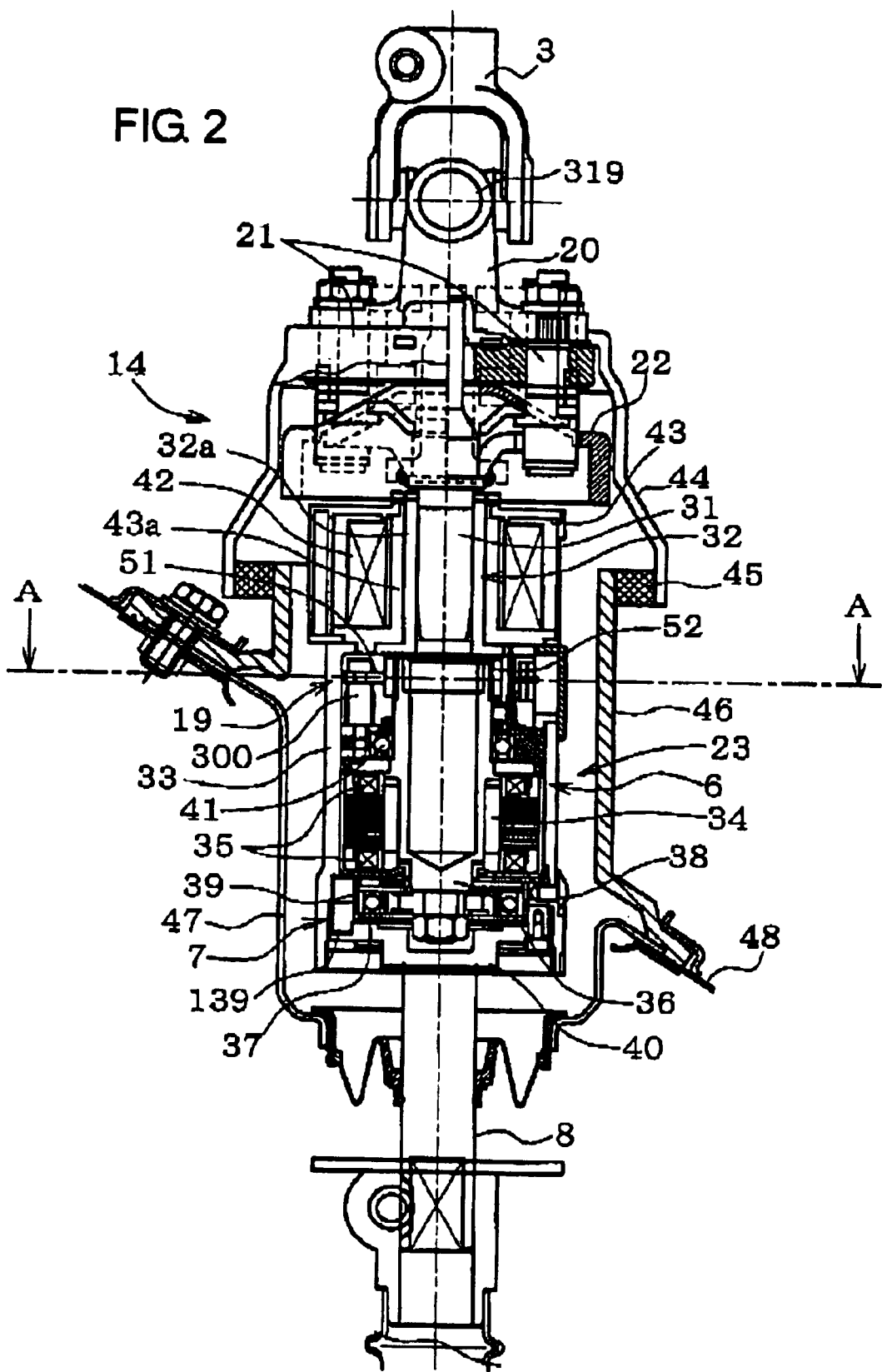
FIG. 2 is a longitudinal sectional view showing one embodiment of a drive section unit.

FIG. 2 shows an example of the configuration of a drive section unit 14 having the motor 6 for the wheel steering shaft 8 with the drive section unit 14 being mounted on the vehicle. The drive section unit 14 is so constituted that when the handle shaft 3 is rotated by the manipulation of the handle 2 (see FIG. 1), a motor casing 33 is rotated bodily with the motor 6 incorporated therein. In this particular embodiment, the handle shaft 3 is connected through a universal joint 319 with an input shaft 20, which is connected to a first coupling member 22 by means of bolts 21, 21. The first coupling member 22 is bodily formed with a pin 31. This pin 31 is engaged and inserted into a sleeve 32a which extends rearward from the center of a plate portion of a second coupling member 32. The cylindrical motor casing 33 is made integral with the other surface of the plate member of the second coupling member 32. A numeral 44 denotes a cover made of rubber or resin and is rotatable with the handle shaft 3. Further, a numeral 46 denotes a casing for housing the drive section unit 14 integrated onto a cockpit panel 48, and a numeral 45 denotes a seal ring for sealing a juncture portion between a cover 44 and the casing 46.

Figure 3:
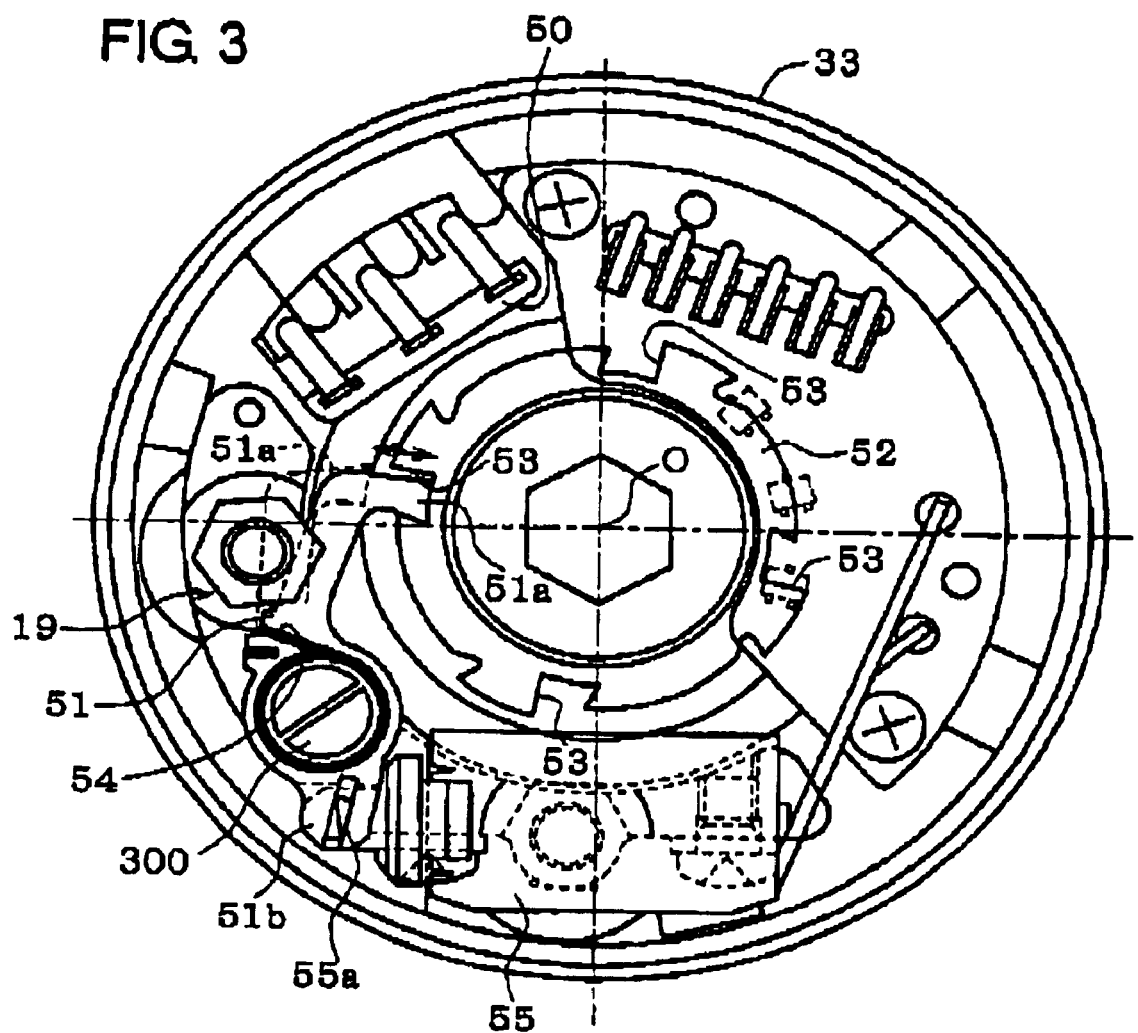
FIG. 3 is a cross-section taken along the line A—A in FIG. 2.

Inside the motor casing 33, stator parts 23 of the motor 6 including coils 35, 35 are assembled integrally. Inside the stator parts 23, a motor output shaft 36 is assembled to be rotatable through bearings 41. An armature 34 composed of permanent magnets is united on the external surface of the motor output shaft 36, and the coils 35, 35 are arranged with the armature 34 being put therebetween. As shown in FIG. 3, a power supply terminal 50 is taken out from the coils 35, 35 to face at the rear surface of the motor casing 33, and the electric power for the coils 35, 35 is supplied to the power supply terminal 50 through a supply cable 42.

As described later, the motor 6 in this particular embodiment is a brushless motor, and the supply cable 42 is constituted in the form of a belt-like collective cable to which wires are collected for individually supplying electric power to the coils 35, 35 for respective phases of the brushless motor. A cable casing 43 with a hub 43a is provided in abutting contact with the rear end surface of the motor casing 33, and the supply cable 42 is housed therein having been wound like a coil around the hub 43a. The terminal of the supply cable 42 opposite to that connected to the supply terminal 50 is secured to the hub 43b of the cable casing 43. When the handle shaft 3 is rotated together with the motor casing 33 and hence, together with the supply terminal 50 in the positive-going direction or the negative-going direction, the supply cable 42 within the cable casing 43 is brought about to be coiled around the hub 43b or uncoiled therefrom thereby to play its role to absorb the rotation of the motor casing 33.

The rotation of the motor output shaft 36 is transmitted to the wheel steering shaft 8 after being reduced by a reduction mechanism 7 to a predetermined ratio (e.g., 1/50). The reduction mechanism 7 in this particular embodiment is constituted by a harmonic drive reduction mechanism. More specifically, the motor output shaft 36 is provided bodily thereon with an elliptical bearing 37 with an inner race, around which a deformable, thin outer gear 38 is fit. Internal gears 39, 139 united bodily with the wheel steering shaft 8 through a coupling 40 are in mesh with the external gear portion of the outer gear 38. The internal gears 39, 139 comprise those hereinafter referred to as "first internal gear 39" and as "second internal gear 139" which are arranged in co-axial alignment. The first internal gear 39 is fixed to the motor casing 33 for bodily rotation therewith, while the second internal gear 139 is not fixed to the motor casing 33 thereby to be rotatable relative thereto. The first internal gear 39 has no difference in the number of teeth from the outer gear 38 meshed therewith, so that the relative rotation of the first internal gear 39 to the outer gear 38 does not take place. In other words, the first internal gear 39 and hence, the motor casing 33 and the handle shaft 3 are so connected with the motor output shaft 36 as to effect idle rotation. On the other hand, the second internal gear 139 is made larger by two (2) for example in the number of teeth than the outer gear 38. Thus, assuming now that the number in teeth of the second internal gear 139 is (N) and the difference in the number of teeth between the outer gear 38 and the second internal gear 139 is (n), the second internal gear 139 transmits the rotation of the motor output shaft 36 to the wheel steering shaft 8 at the reduction ratio of (n/N). For smaller construction, the internal gears 39, 139 in this particular embodiment are arranged in co-axial alignment with the input shaft 20 of the handle shaft 3, the motor output shaft 36 and the wheel steering shaft 8.

As best shown in FIG. 3, the lock mechanism 19 is composed of a lock member 51 secured to a lock base part (e.g., the motor casing 33 in this particular embodiment) which is not rotatable relative to the handle shaft 3, and a lock receiving member 52 provided at a lock receiving base part (e.g., the motor output shaft 36). The lock member 51 is provided to be movable between a lock position where it is engaged with a lock receiving portion 53 formed on the lock receiving member 52 and an unlock position where it retracted away from the lock receiving portion 53. In this particular embodiment, the lock receiving member 52 which rotates bodily with the wheel steering shaft 8 is formed at a circumferential surface thereof with plural (e.g., four) lock receiving portions 53 at regular intervals. The lock portion 51a provided at one end of the lock member 51 is engageable with any one of the plural lock receiving portions 53 selectively in dependence upon the rotational angular phase of the wheel steering shaft 8. The handle shaft 3 is connected through the coupling 22 and pins (not numbered) with the motor casing 33 not to be rotatable relative thereto.

When the lock member 51 is disengaged from the lock receiving member 52 (i.e., in the case of unlock), the motor output shaft 36 is rotated relative to the motor casing 33, and such rotation of the motor output shaft 36 is transmitted through the outer gear 38 to the first internal gear 39 and the second internal gear 139. Since the first internal gear 39 secured to the motor casing 33 does not rotate relative to the outer gear 38 as mentioned previously, it rotates at the same speed as the handle shaft 3 in consequence. That is, the first internal gear 39 is rotated to follow the manipulation of the steering handle 2. The second internal gear 139 transmits the rotation of the motor output shaft 36 to the wheel steering shaft 8 at a reduced speed thereby to rotationally drive the wheel steering shaft 8. On the contrary, when the lock member 51 and the lock receiving member 52 are engaged to be brought into the lock state, the motor output shaft 36 is not rotatable relative to the motor casing 3. Since of the internal gears 39 and 139 of the reduction mechanism 7, the first internal gear 39 is secured to the motor casing 33, the rotation of the handle shaft 3 is transmitted without being reduced in speed to the wheel steering shaft 8 through the first internal gear 39, the outer gear 38 and the second internal gear 139 in order.

In this particular embodiment, the lock receiving member 52 is secured on the external surface of one end of the motor output shaft 36, and each of the lock receiving portions 53 is formed to be like a cutout groove which is cut into the lock receiving member 52 radially inwardly thereof. Further, as shown in FIG. 2, the lock member 51 is supported on a rotational base 300 provided on the motor casing 33 and is rotatable about an axis extending almost in parallel with the wheel steering shaft 8. The lock member 51 is connected at its rear end portion 55a with a solenoid 55. A resilient member 54 is provided for resiliently returning the lock member 51 to a home position thereof when the solenoid 55 is relieved of being energized. A protrusion 55a formed at one end of the solenoid 55 is fit in a groove formed at the rear end portion 51b of the lock member 51, so that the solenoid 55 is able to move or rotate the lock member 51 to the lock position against the resilient member 54. Thus, upon the energization or de-energization of the solenoid 55, the lock portion 51a of the lock member 51 is brought into engagement with the lock receiving member 52 for a lock operation or disengagement therefrom for an unlock operation. It is selectable to use the energization of the solenoid 55 for the lock operation or the unlock operation. In this particular embodiment, the energization of the solenoid 55 is determined to bring about the unlock operation. With this arrangement, when the solenoid 55 is relieved from the energization in the event of the power cut-off, the resilient member 54 works to bring the lock member 51 into the lock state, so that it becomes possible to do the manual steering.

Figure 4:
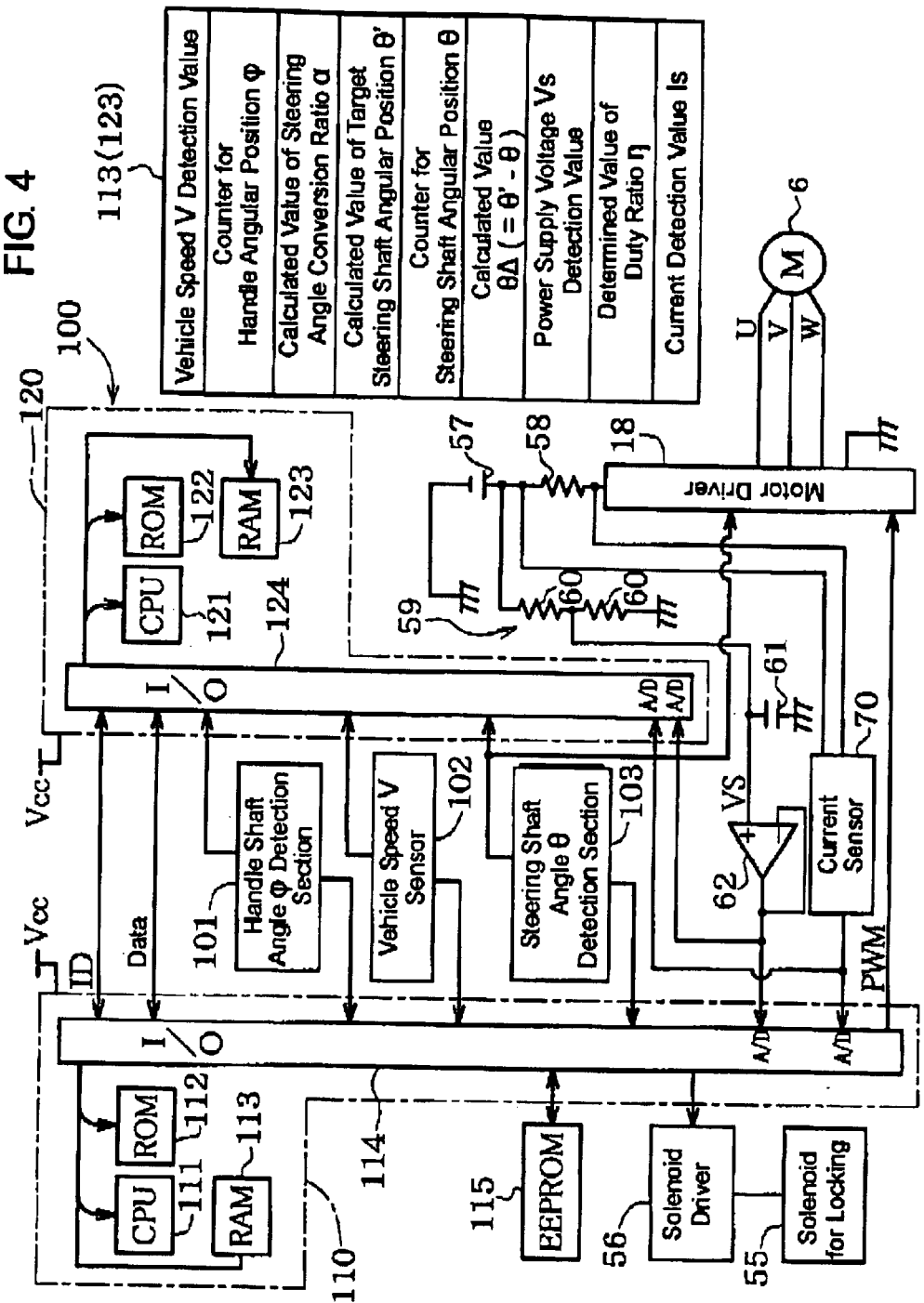
FIG. 4 is a block diagram showing the electric configuration of the vehicle steering control system.

FIG. 4 is a block diagram exemplifying the electric configuration of the steering control section 100. Two microcomputers 110 and 120 make key components of the steering control section 100. The main microcomputer 110 is composed of a main CPU 111, a ROM 112 storing control programs, a RAM 113 serving as a working area for the CPU 111 and an input/output interface 114. The secondary or sub microcomputer 120 is composed of a sub CPU 121, a ROM 122 storing control programs, a RAM 123 serving as a working area for the sub CPU 121 and an input/output interface 124. It is the main microcomputer 110 that directly controls the operation of the motor 6 for driving the wheel steering shaft 8. The sub microcomputer 120 performs data processing of various kinds such as parameter arithmetic operations which are necessary for the operation control of the motor 6, in parallel operation with the main microcomputer 110. The sub microcomputer 120 communicates with the main microcomputer 110 for the conveyance of the results of such data processing, so that it performs its role as a support control section which observes and confirms whether the operation of the main microcomputer 110 is normal or not and which completes information for the main microcomputer 110, as the need arises. The data communication between the main microcomputer 110 and the sub microcomputer 120 in this particular embodiment is performed by the communication between the input/output interfaces 114 and 124. The both of the microcomputers 110 and 120 are supplied with a supply voltage (e.g., +5V) from a stabilized power supply (not shown) even after the termination in operation of the vehicle, so that the RAMs 113, 123 and an EPROM 115 referred to later are able to maintain the contents stored therein.

Each output from the handle shaft angle detection section 101, the vehicle speed detection section 102 and the steering shaft angle detection section 103 is distributed to the input/output interfaces 114 and 124 of the main microcomputer 110 and the sub microcomputer 120. In this particular embodiment, each of the sections 101, 102 and 103 is constituted by a rotary encoder, whose count signal is input directly to digital data ports of input/output interfaces 114 and 124 through a schmitt trigger circuit, not shown. Further, the solenoid 55 constituting a driver section of the aforementioned lock mechanism 19 is connected to the input/output interface 114 of the main microcomputer 110 through a solenoid driver 56.

The motor 6 is constituted by a brushless motor or a three-phase brushless motor in this embodiment, whose rotational speed is controlled in a known PWM (Pulse Width Modulation) control method. The motor driver 18 is connected to a vehicle-mounted battery 57 serving as a power supply for the motor 6. The voltage (i.e., supply voltage) of the battery 57 which is applied to the motor driver 18 varies (e.g., from 9 to 14 volts) from time to time in dependence upon the states of various loads arranged at many parts of the vehicle as well as upon the state of the power generation by an alternator. In this particular embodiment, the battery voltage (Vs) which fluctuates like this is used as the motor supply voltage as it is, without being controlled by any stabilized power supply circuit. The steering control section 100 carries out the control of the motor 6 by the use of the power supply voltage (Vs) which fluctuates within a considerable range as mentioned previously, and hence, is provided with a detection section for the power supply voltage (Vs). More specifically, in this particular embodiment, a branch path for voltage detection is taken out from an energizing path to the motor 6, that is, from right before the driver 18, and a voltage detection signal is extracted through voltage divider resistances 60, 60 provided on the branch path. The voltage detection signal is smoothened by a condenser 61 and is input through a voltage follower 62 to input ports (hereafter referred to as "A/D ports") with an A/D converter function of the input/output interfaces 114 and 124.

Figure 5:
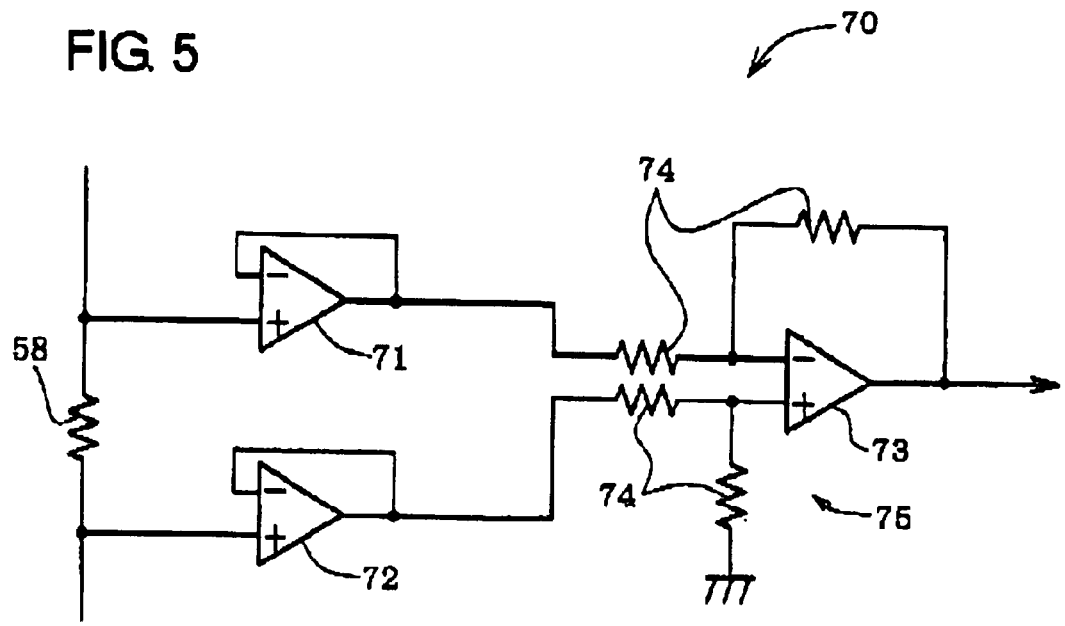
FIG. 5 is a circuit diagram exemplifying a current sensor.

In order to observe the state of the current being applied to the motor 6 such as the occurrence of an overcurrent, a current detection section is provided on the path of the current being applied to the motor 6. More specifically, a current sensor 70 is provided to detect the voltage across a shunt resistance 58 provided as a current detection resistance on that path, and the detected voltage is input the A/D ports of the input/output interfaces 114 and 124. As shown in FIG. 5, the current sensor 70 extracts the voltage across the shunt resistance 58 by means of voltage followers 71, 72 and amplifies the extracted voltage by a differential amplifier circuit 75 so as to output therefrom. The differential amplifier circuit 75 is composed of an operational amplifier IC (Integrated Circuit) 73 and resistances connected around the same. The output from the differential amplifier circuit 75 represents that proportional to the value of the current flowing through the shunt resistance 58, so that it can be used as the voltage detection output.

Referring back to FIG. 4, the RAMs 113, 123 of the microcomputers 110, 120 are formed respectively with the following memory areas.
(1) Vehicle speed detection value memory: to store the detection value of a present vehicle speed (V) from the vehicle speed sensor 102.
(2) Handle shaft angle position ($\phi$) counter memory: to count counting number signals from a rotary encoder constituting the handle shaft angle position detection section 101 and to store the count value representing the handle shaft angle position ($\phi$). The rotary encoder used is of the type that it is capable of discriminating the rotational direction thereof and increments or decrements its count content when the rotational direction is in a positive-going direction or a negative-going direction.
(3) Steering angle conversion ratio ($\alpha$) calculated value memory: to store the steering angle conversion ratio ($\alpha$) calculated based on the vehicle speed detection value.
(4) Target steering shaft angular position ($\theta'$) calculation value memory: to store a target value of the steering shaft angular position calculated from the multiplication ($\phi \times \alpha$) for example based on the present handle shaft angular position ($\phi$) and the steering angle conversion ratio ($\alpha$), that is, to store a target steering shaft angular position ($\theta'$).
(5) Steering shaft angular position ($\theta$) counter memory: to count counting signals from the rotary encoder constituting the steering shaft angle detection section 103 and store the count value representing the steering shaft angular position ($\theta$). The steering shaft angle detection section 103 is to detect the rotation of the steering shaft drive motor 6 and is constituted by an incremental type rotary encoder capable of discriminating the rotational direction thereof. The detection section 103 increments the aforementioned counter when the wheel steering shaft 8 is rotated in the positive-going direction and decrements it when the wheel steering shaft 8 is rotated in the negative-going direction.
(6) $\Delta\theta$ calculation value memory: to store the difference $\Delta\theta$ ($=\theta'-\theta$) between the target steering shaft angular position ($\theta'$) and the present steering shaft angular position ($\theta$).
(7) Power supply voltage (Vs) detection value memory: to store the detection value of the power supply voltage (Vs) for the motor 6.
(8) Duty ratio ($\eta$) determination value memory: to store a duty ratio ($\eta$) determined based on $\Delta\theta$ and the power supply voltage (Vs) for the application of current to the motor 6 under the PWM control.
(9) Current detection value (Is) memory: to store a current detection value (Is) depending on the output (after compensation referred to later) from the current sensor 70.

With the foregoing arrangements or preparations made, the main microcomputer 110 functions as the following various means in accordance with control programs having been stored in the ROM 112, simultaneously of which the sub microcomputer 120 performs the same processing as the main microcomputer 110 does, in accordance with programs having been stored in the ROM 122 to observe the operation of the main microcomputer 110.
① Offset compensation means: to compensate the output of the current sensor 70 based on offset compensation information referred to later.
② Power supply voltage measuring means: to measure the power supply voltage applied to the shunt resistance 58.
③ Current compensation means: to compensate the output from the current sensor 70 based on current gain compensation information.
④ Lock control means (Motor operation restraining means): to switchover the energizing state of the locking solenoid 55 to bring the handle shaft 3 and the wheel steering shaft 8 into the locking connection with each other and for discontinuing the rotation of the motor 6 when a predetermined abnormal discrimination condition like the overcurrent on the output of the current sensor 70 is satisfied.

Further, the input/output interface 114 of the main microcomputer 120 is provided with the EEPROM (Electrically Erasable Programmable ROM serving as Offset compensation information memory means and current gain compensation information memory means) 115 for storing the angular position of the wheel steering shaft 8 upon termination of the operation (i.e., at the time of the ignition switch being turned OFF), that is, the angular position of the wheel steering shaft 8 at the shutdown in addition to offset compensation information and current gain compensation information referred to later relating to the output of the current sensor 70. The EEPROM (PROM) 115 enables the main CPU 111 to read out data therefrom when it is under a first operation voltage (−5V) wherein the main CPU 111 performs data read-out/write-in with respect to the RAM 112 therefor. On the other hand, the EEPROM (PROM) 115 enables the main CPU 111 to execute data write-in thereinto when it is placed under a second operation voltage different from the first operation voltage (in this particular embodiment, there is employed a higher voltage such as, e.g., +7V than the first operating voltage). Thus, even in the event that the main CPU 111 runs under the out-of-control, it does not happen that the stored content of the EEPROM 115 can be rewritten by mistake. The second operation voltage is generated by a voltage boost-up circuit not shown which is interposed between the EEPROM 115 and the input/output interface 114.

The operation of the vehicle steering control system 1 as constructed above will be described hereafter.

Figure 12:
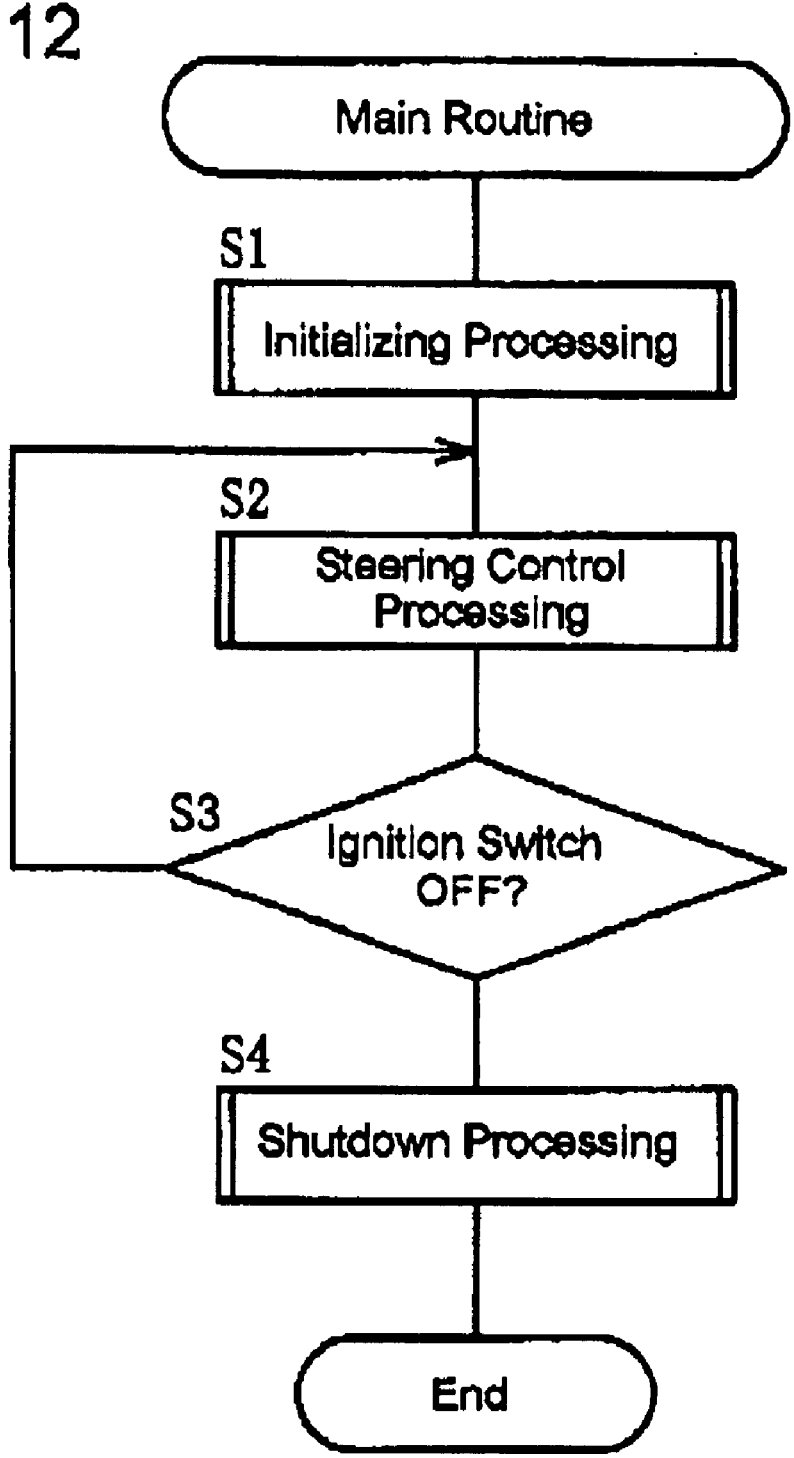
FIG. 12 is a flow chart showing a main routine for computer processing in the vehicle steering control system.

FIG. 12 shows the operation flow of a main routine of the control program executed by the main microcomputer 110. Step S1 is for an initializing processing, whose essential is to read out the shutdown angular position referred to later of the wheel steering shaft 8 which has been written into the EEPROM 115 through a shutdown processing executed when the ignition switch was turned OFF at the last time and then, to set the read-out shutdown angular position as an initial angular position of the wheel steering shaft 8 at the processing starting. To be concrete, a counter value representing the shutdown angular position is set into the aforementioned steering shaft angular position counter memory. A flag for indicating the completion of data write-in into the EEPROM 115 as referred to later is cleared at this time.

Figures 9, 10:
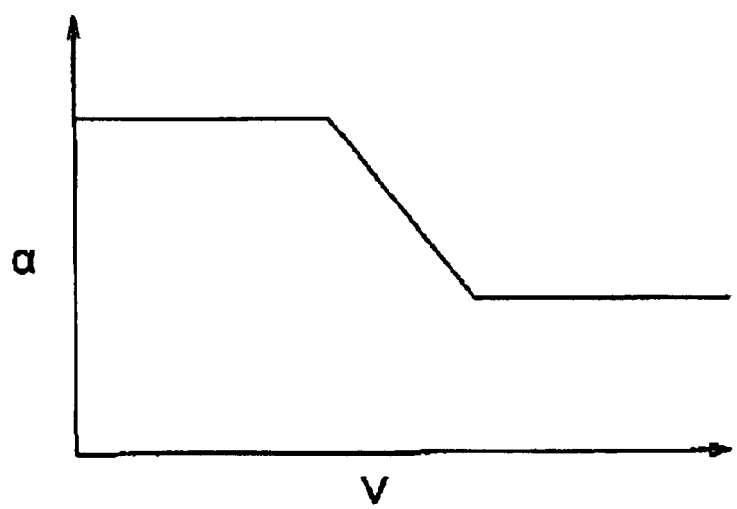
FIG. 9 is an explanatory view showing a table making relation between steering angle conversion ratios and vehicle speeds.
FIG. 10 is a graph showing a pattern in which the steering angle conversion ratio is varied with increase in vehicle speed.

Upon completion of the initialization, the routine proceeds to step S2 to execute the steering control processing. This processing is repetitively executed at a constant time interval (e.g., several hundred microseconds) to equalize the intervals for parameter samplings. The details of this processing will be described with reference to FIG. 13. The detection value of a present vehicle speed (V) is read at step S201, and the handle shaft angular position ($\phi$) is read at step S202. The steering conversion ratio ($\alpha$) for converting the handle shaft angular position ($\phi$) into the target steering shaft angular position ($\theta'$) based on the calculated value of the vehicle speed (V) is determined at step S203. The steering conversion ratio ($\alpha$) is set to a different value depending on the vehicle speed (V). More specifically, as shown in FIG. 10, the steering conversion ratio ($\alpha$) is set to be smaller when the vehicle speed (V) is larger than a predetermined value, but is set to be larger when it is smaller than the predetermined value. In this particular embodiment, each of the ROMs 112, 122 has in advance stored therein a table 130 defining various set values of the steering angle conversion ratio ($\alpha n$) which correspond respectively to various vehicle speeds (Vn), as shown in FIG. 9, and a steering conversion ratio ($\alpha$) corresponding to the present vehicle speed (V) is calculated in a well-known interpolation method by reference to the table 130. Although in the present embodiment, the vehicle speed (V) is utilized as information representing the driving state of the vehicle, information of another kind such as the lateral pressure acting on the vehicle body, the inclination angle of the road surface or the like may be detected by a sensor therefor as information representing the driving state of the vehicle, and the steering conversion ratio ($\alpha$) may be set to a particular value in dependence upon the detected value. In another modified form, a basic value of the steering conversion ratio ($\alpha$) is determined in dependence upon the vehicle speed (V) and as the need arises, may be compensated for the aforementioned other information except for the vehicle speed (V) for use as the steering conversion ratio ($\alpha$).

Step S204 involves calculating the target steering shaft angular position ($\theta'$) by multiplying the determined steering conversion ratio ($\alpha$) with the detected handle shaft angular position ($\phi$). Then, the present steering shaft angular position ($\theta$) is read at step S205. Step S206 is executed to calculate the difference ($\Delta\theta = \theta' - \theta$) between the target steering shaft angular position ($\theta'$) and the present steering shaft angular position ($\theta$) obtained from the steering shaft angular position counter. Further, the detection value of the present power supply voltage (Vs) is read at step S207.

The motor 6 rotationally drives the wheel steering shaft 8 to decrease the difference ($\Delta\theta$) between the target steering shaft angular position ($\theta'$) and the present steering shaft angular position ($\theta$). In order that the present steering shaft angular position ($\theta$) approaches quickly and smoothly to the target steering shaft angular position ($\theta'$), the rotational speed of the motor 6 is made high when the difference ($\Delta\theta$) is large, but low when the same is small. Basically, there is performed a proportional control taking the difference ($\Delta\theta$) as parameter. In order to restrain the overshooting, hunting and the like for a more stabilized control, preferably, a well-known PID control is performed taking the differentiation or integration of the difference ($\Delta\theta$) into account.

The motor 6 is operated under the PWM control as mentioned earlier, and the rotational speed is adjusted by varying the duty ratio ($\eta$). The duty ratio ($\eta$) is determined at step S208 in FIG. 13. If the power supply voltage (Vs) were kept constant, the rotational speed could be adjusted exclusively in dependence upon the duty ratio ($\eta$). However, the power supply voltage in this embodiment is not constant as mentioned previously. Therefore, in this particular embodiment, the duty ratio ($\eta$) is determined taking into account the power supply voltage (Vs) in addition to the aforementioned difference ($\Delta\theta$). For example, each of the ROMs 112, 122 has stored therein a duty ratio conversion table 131 of a second dimension type which is prepared to define numerous duty ratios ($\eta$) in correspondence to various combinations of the power supply voltage (Vs) and the difference ($\Delta\theta$), as shown in FIG. 11, and one of the duty ratios ($\eta$) is selected in dependence on the detected value of the power supply voltage (Vs) and the calculated value of the difference ($\Delta\theta$). The rotational speed of the motor 6 fluctuates in dependence upon the variation in the load acting thereon, in which case a modification may be made that the state of the load acting on the motor 6 is inferred based on a detection value of the motor current (Is) from the current sensor 70 and that the duty ratio ($\eta$) is compensated for the inferred load state of the motor 6 before the actual use.

Next, the routine proceeds to step S209 for a current detection processing. As described earlier, the current sensor 70 operates to output, as the current detection output signal (this signal (Vf) per se is a voltage signal) from the differential amplifier circuit 75, the voltage difference across the shunt resistance 58 provided on the power supply path which leads from the vehicle-mounted battery 57 constituting the power supply for the motor 6 to the driver 18 for the motor 6. Then, the current detection output signal (Vf) is compensated for the offset compensation information and the current gain compensation information both stored in the EEPROM 115, so that the current detection output signal (Vf) so compensated is used as the final current detection value (Is).

Figure 6:
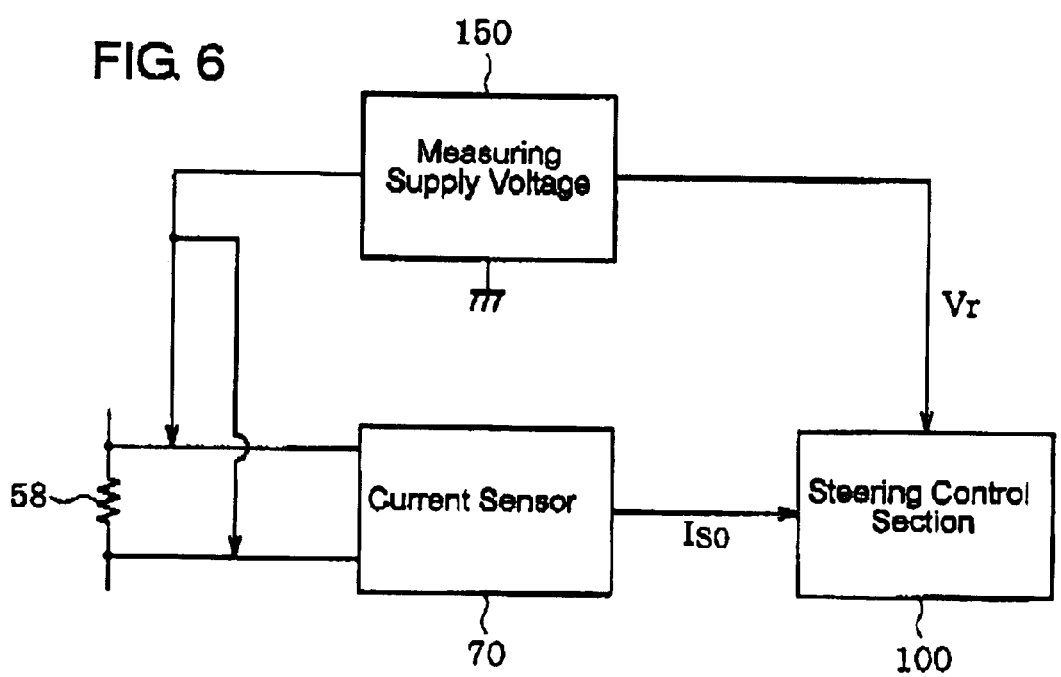
FIG. 6 is a circuit diagram exemplifying a circuit for preparing offset compensation information.

Prior to the shipment of the vehicle steering control system 1, the offset compensation information and the current gain compensation information are prepared in accordance with the flow chart shown in FIG. 8 as follows:

First of all, there is prepared a circuit board constituting the steering control section 100 on which board the assembling of hardware components has been completed. On the circuit board, as shown in FIG. 6, a terminal of a power supply 150 for measurement is branched and the branched terminals are connected to two input terminals of the current sensor 70 which are respectively connected with the both ends of the shunt resistance 58. This particular embodiment uses a stabilized power supply unit which is dedicated for output power supply voltage variable within a predetermined range. An output voltage value (Vr) of the measuring power supply is connected to be input to the steering control section 100 (to be more exact, to the main microcomputer 110 and the sub microcomputer 120 therein). In this case, the steering control section 100 is not connected to the battery 57, and instead, the measuring power supply 150 serves to an operating power supply for the steering control section 100. Consequently, the range of the output power supply voltage in the measuring power supply 150 is set to include the lowest operating voltage of the steering control section 100 (e.g., 9V at which voltage the main microcomputer 110 and the sub microcomputer 120 are guaranteed to operate adequately) and the uppermost operating voltage (e.g., 14V which is the maximum battery voltage as the addition of the alternator voltage to the lowest operating voltage is taken into consideration).

Referring back to FIG. 8, step T1 is executed to set the output voltage of the measuring power supply 150 to V1 (e.g., the lowest operating voltage 9V) with all the semiconductor switching elements of the driver 18 being turned OFF. Thus, the same voltage (V1) is applied at the both ends of the shunt resistance 58, and no current flows as a matter of course. And, two input voltages to the differential amplifier circuit 73 of the current sensor 70 come to have the same voltage (V1). An offset output voltage (E01) of the current sensor 70 at this time is read by the main microcomputer 110 and the sub microcomputer 120 to be stored in the RAMs 113, 123 thereof. At the next step T2, the output voltage of the measuring power supply 150 is set to V2 (e.g., the uppermost operating voltage 14V), at which time an offset output voltage (E02) of the current sensor 70 is read by the main microcomputer 110 and the sub microcomputer 120 to be stored in the RAMs 113, 123 thereof.

At step T3, an offset gradient (G0) is calculated by the following equation in accordance with a data preparation program which has been loaded in advance into the RAMs 113, 123 of the main microcomputer 110 and the sub microcomputer 120.

$$G0=(E02-E01)/(V2-V1) \quad ①$$

The gradient G0 represents how much the offset output E0 varies as the power supply voltage (V) varies a unit amount. Further, an offset intercept (C) is calculated by the following equation at step T4.

$$C=E02-G0-G0 \times V2 \quad ②$$

Figure 16:
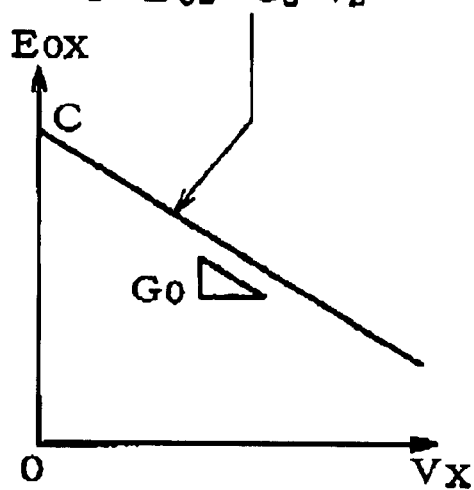
FIG. 16 is a graph explaining the processing at step T4 in FIG. 8.

As shown by the graph in FIG. 16, an inference value of the offset output when a certain power supply voltage (Vx) is given is represented by a two-point approximation based on the aforementioned two power supply voltages (V1, V2) as follows:

$$E0=G0 \times (Vx-V2)+E02 \quad ③$$

This equation is transformed as follows:

$$E0=G0 \times Vx+C \quad ③'$$

Figure 7:
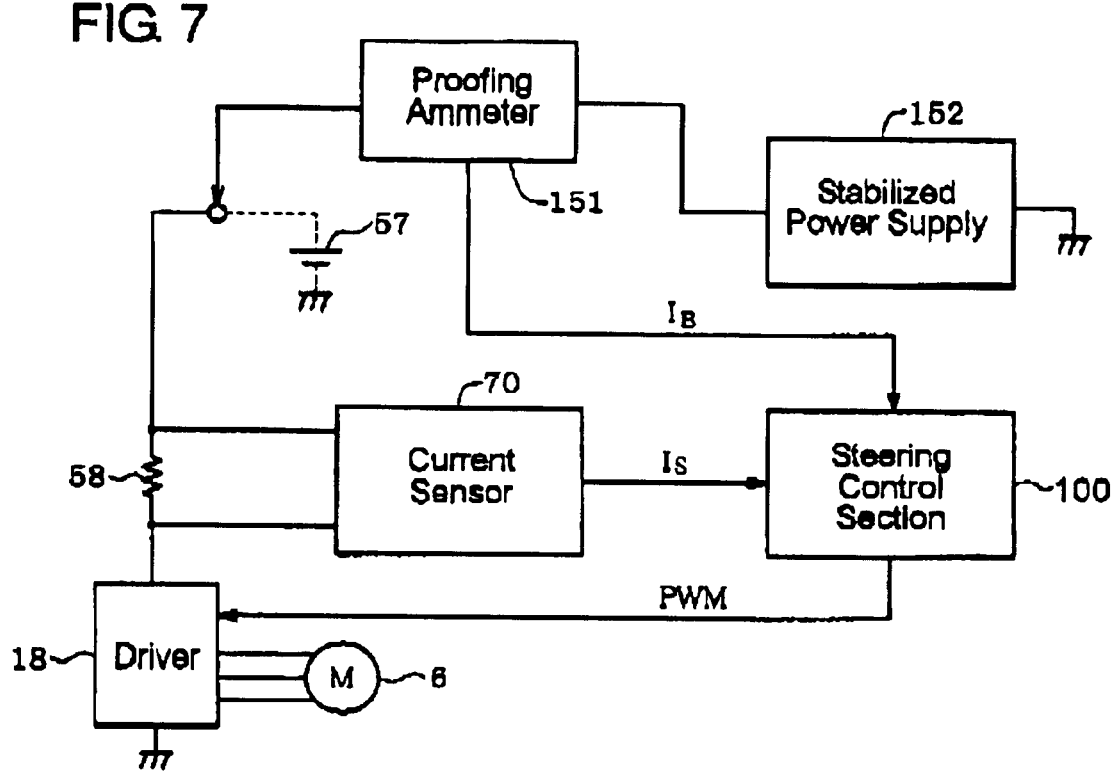
FIG. 7 is a circuit diagram exemplifying a circuit for preparing current gain compensation information.

The offset intercept (C) calculated by the equation ② represents an inference value (E0x) which the offset output is inferred to be when the power supply voltage (Vx) is zero. These (G0) and (C) are offset information, and the offset compensation is made based on the equation ③' above at the current detection processing step S209 in FIG. 13. Although the equation ③' is an equation of the first degree for two-point approximation, three or more points may be measured for higher accuracy, in which case there may be employed a gradient (G0) and an offset intercept (C) of a line calculated in the least-squares method. Further, where three or more points are measured, an equation for the offset compensation which is made by performing not a linear regression but a non-linear regression using a polynominal may be used in place of the equation ③' above Next, the measuring circuit is rewired as shown in FIG. 7. That is, a stabilized power supply 152 whose output voltage is a constant value (Vm) (or whose output voltage may be variable) is substituted for the battery 57 and is connected to the shunt resistance 58. A proofing ammeter 151 which is more precise than the current sensor 70 is connected as a reference current measuring instrument onto the path leading the stabilized power supply 152 to the shunt resistance 58. The connection is such that an output (IB) of the proofing ammeter 151 is input to the main microcomputer 110 and the sub microcomputer 120 of the steering control section 100.

Figure 8:
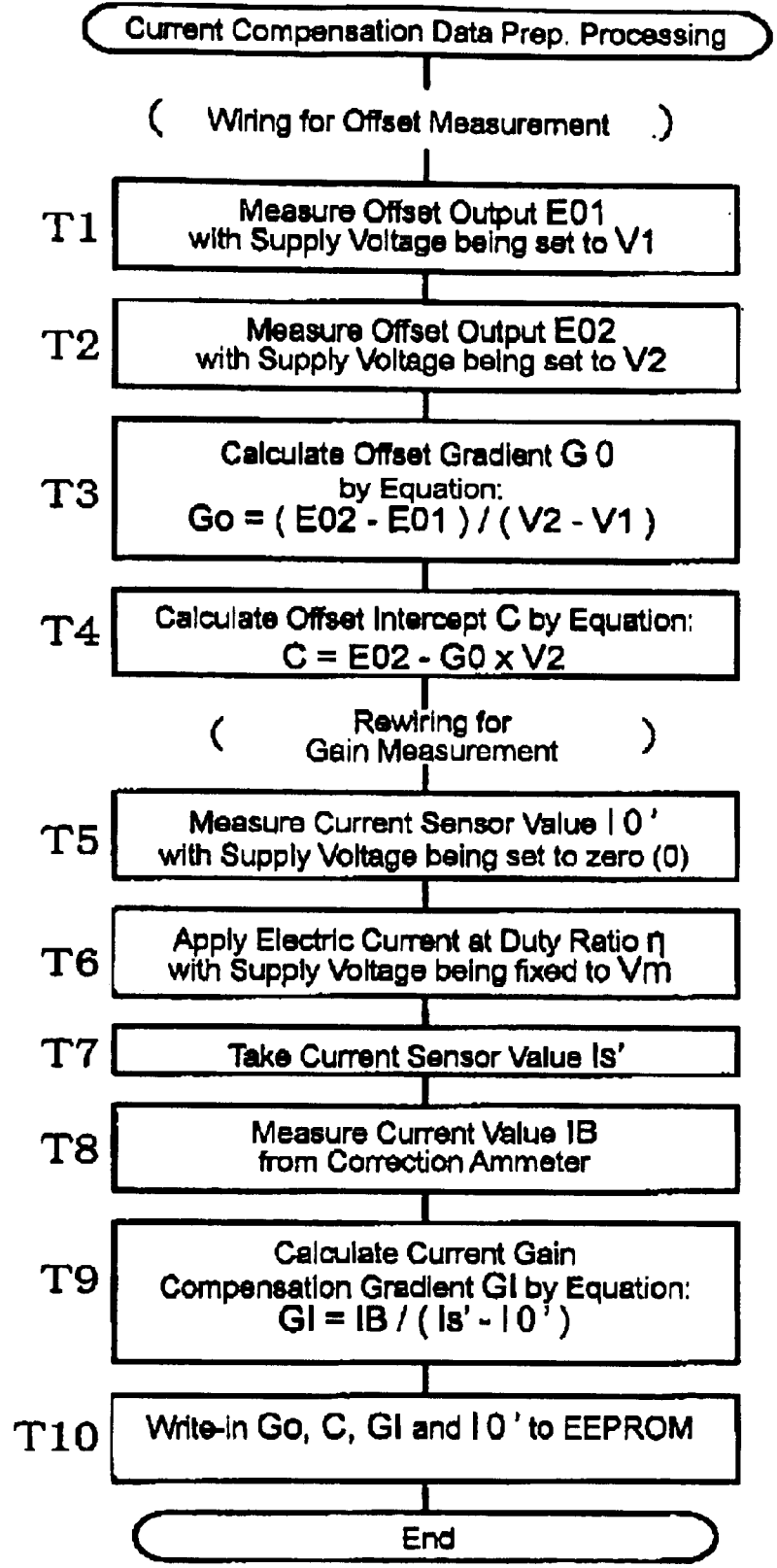
FIG. 8 is a flow chart showing steps of procedure for preparing the offset compensation information and the current gain compensation information.

Again in FIG. 8, at step T5, the voltage of the stabilized power supply 152 is made zero, in which state the output (I10') (which is hereafter referred to as "current sensor value" because the output voltage value is readable directly owing to coefficient conversion) of the current sensor 7 is read out by the main microcomputer 110 and the sub microcomputer 120 and is stored in the RAMs 113, 123 thereof. The value (IB) indicated by the proofing ammeter 151 at this time is assumed as zero, whereby one measuring point for correction of the current gain can be obtained. It is to be noted that if the value so obtained is much different from zero, the proofing ammeter 151 is useless as a reference current measuring system.

At next step T6, the output voltage of the measuring power supply 150 is set to Vm (e.g., 12V) and the duty ratio is set to a predetermined value (e.g., 50% in this particular embodiment), in which state the main microcomputer 110 applies an electric current under the PWM control to the motor 6 through the driver 18. Then, the value (Is') of the current sensor 70 and the value (IB) indicated by the proofing ammeter 151 are read by the main microcomputer 110 and the sub microcomputer 120 and are stored in the RAMs 113, 123 thereof respective at steps T7, T8. This results in obtaining another measuring point for the current gain compensation.

Subsequently, at step T9, a gradient (GI) for the current gain compensation is calculated by the following equation in accordance with a data preparation program which has been loaded in advance in the RAMs 113, 123 of the main microcomputer 110 and the sub microcomputer 120.

$$G1=IB/(Is'-I0') \quad ④$$

This gradient (GI) represents how much the gain compensated current (hereafter referred to as "real current value (I)") varies as the current sensor value (Is') varies a unit amount. Instead of using the equation ④ above of two-point approximation, the gradient may be obtained in the least squares method by measuring three or more points for higher precision.

At step T10, the values (G0), (C), (GI) and (I0') obtained as aforementioned are stored in the EEPROM 115 as the offset compensation information and the current gain compensation information.

Figure 13:
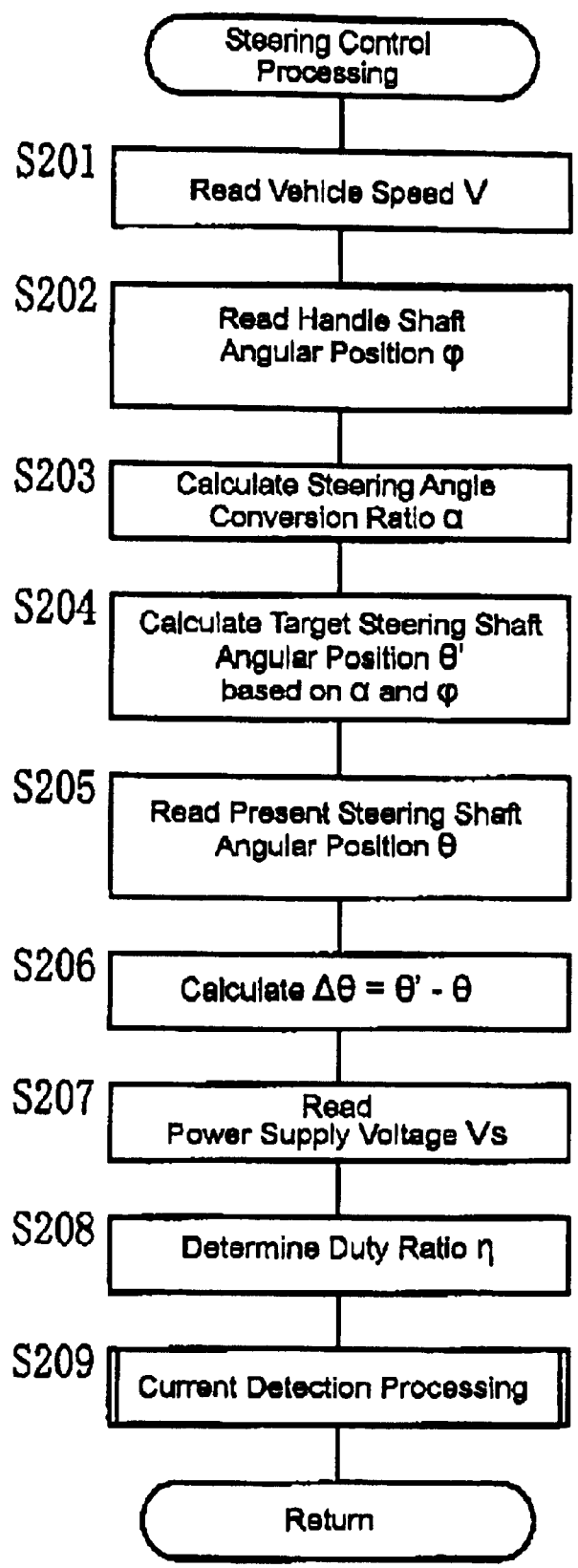
FIG. 13 is a flow chart showing one example of the details of a steering control processing S2 shown in FIG. 12.
Figure 14:
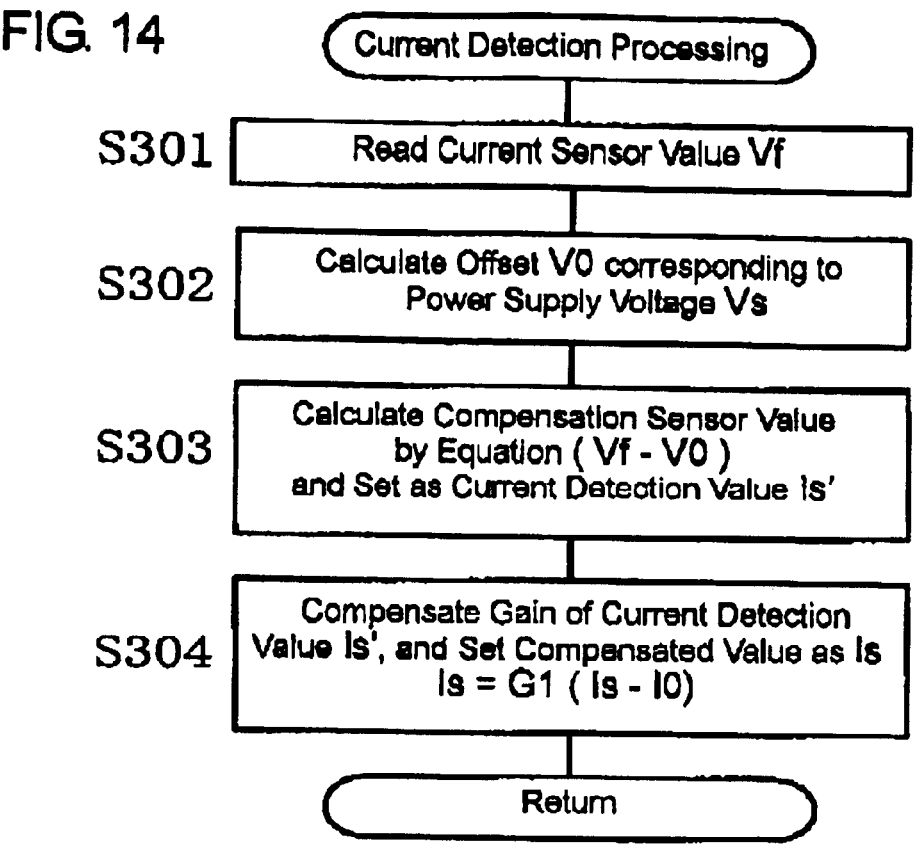
FIG. 14 is a flow chart showing one example of the details of a current detection processing S209 shown in FIG. 13.
Figure 15:
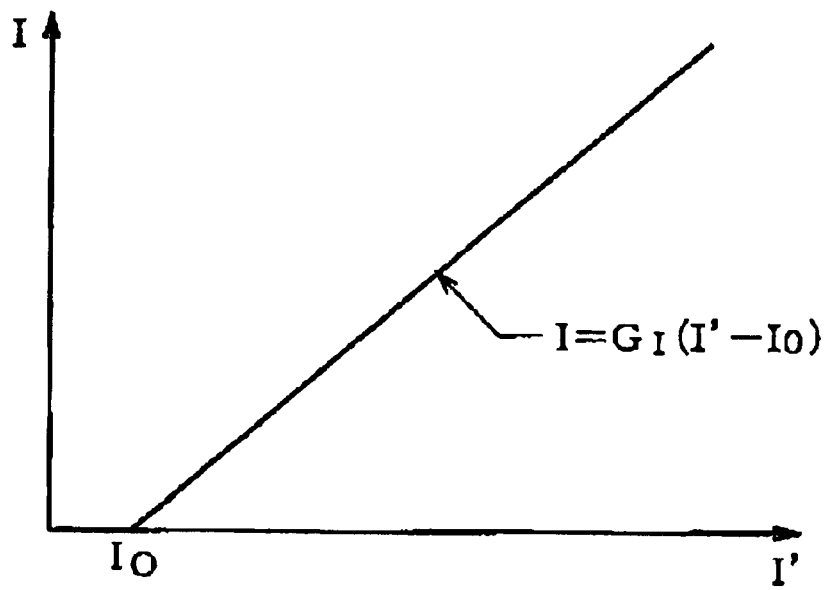
FIG. 15 is a graph showing the relation between an offset compensated current detection value and a compensated current detection value for use in calculating the latter value.

FIG. 14 shows the details of the current detection processing. Step S301 is executed to read the output (Vf: current sensor value) of the current sensor 70. At step S302, an inference value (V0) of the offset output from the power supply voltage (Vs) which has already been read at step S207 in FIG. 13 is calculated by the aforementioned equation ③ using the values (G0), (C) and (Vf) stored in the EEPROM 115. Since this offset output is regarded as having been carried on the current detection output of the current sensor 70, an offset compensation is executed at step S303 by subtracting the offset output (V0) from the sensor output (Vf). That is, if the offset compensated current detection value is taken as (Is'), the following equation holds.

$$Is'=Vf-V0 \quad \text{⑤}$$

Thereafter, a gain compensation is performed at step S304. That is, since the sensor output indicates not zero but the predetermined value (I0') even when the power supply voltage is zero, the predetermined value (I0') is read out from the EEPROM 115 to calculate a difference current (Is'-I0'). Thus, the compensated current detection value (Is) is calculated by multiplying the current gain compensation gradient (GI) read out from the EEPROM 115 with the difference current (Is'-I0').

In this embodiment, when the compensated current detection value (Is) increases beyond a predetermined condition, an overcurrent is judged to have occurred, in which event the handle shaft 3 and the wheel steering shaft 8 are locked with each other in the manner as described earlier to discontinue the rotation of the motor 6. For example, where more than a predetermined period of time continues with the current detection value (Is) remaining higher than a limit value, the overcurrent is judged to have taken place, so that the foregoing lock mechanism 19 can be brought into operation. Of course, when the state of the overcurrent is judged to have been discontinued, the mechanism is released from the locking operation.

Referring back to FIG. 13, the foregoing processing up to step S209 is executed by both of the main microcomputer 110 and the sub microcomputer 120 in parallel time relation. For example, whether the operation of the main microcomputer 110 is normal or not is checked by transferring the arithmetic operation results of various parameters stored in the RAM 113 of the main microcomputer 110 to the sub microcomputer 120 from time to time or at a regular time interval to make the sub microcomputer 120 execute comparison with those stored in the RAM 123 of the same, whereby the sub microcomputer 120 is able to observe the occurrences of malfunctions at the side of the main microcomputer 110. On the other hands, the main microcomputer 110 generates a PWM signal based on a determined duty ratio (η). The main microcomputer 110 outputs the PWM signal to the motor driver 18 while comparing the same with a feedback signal from the rotary encoder constituting the steering shaft angle detection section 103 to drive the motor 6 under the PWM control.

Referring back to FIG. 12, a judgment is made at step S3 of whether or not, the ignition switch has been turned OFF, and a shutdown processing at step S4 is executed when the ignition switch is judged to have been turned OFF. That is, the OFF state of the ignition switch means that the driving or operation of the motorcar has been terminated. In this case, the main microcomputer 110 reads out the shutdown angular position of the wheel steering shaft 8 stored in the steering shaft angular position counter to store the read-out shutdown angular position to the EEPROM 115 and further sets the data write-in completion flag provided in the RAM 113, whereby the shutdown processing at step S4 is completed.

As readily understood from the foregoing detailed description, the embodiment described hereinabove provides the vehicle steering control system whose general inventive concepts can be grasped by the independent claims set forth later.

In specific aspects, the embodiment further provides various improvements summarized as follows.

As is practical in this field, the offset characteristics of differential amplifier circuits are measured with input differential voltages being set to zero. Further, circuit designs have usually been made on the assumption that as far as the difference voltage is zero, the same offset value would be generated no matter how the level of voltages input to the differential amplifier circuit varies. However, from the inventors' study, it was found that where the level of voltages input to the differential amplifier circuit varies, an inneglible change takes place on the offset voltage level of the differential amplifier circuit even if the input difference voltages are both zero. This means that when input voltages equal to each other are input to the two input terminals of the differential amplifier circuit, the input difference voltage becomes zero (0) volt, but that when the level of the same input voltages varies, the offset output comes to represent a different value.

This problem can be solved by the foregoing construction of the embodiment according to the present invention, whereby the variation in the offset voltage caused by the variation of the input voltage level can be relieved effectively and whereby the offset compensation of the output of the current sensor can be made more precisely. That is, in the construction to solve this problem, power supply voltage measuring means is provided for measuring a power supply voltage applied to the current detection resistance. Prior to the actual use of the system, two power supply voltage levels different from each other are selectively set, in which states the offset compensation voltages are measured. In this way, supply voltage-offset characteristic information is prepared and stored. This supply voltage-offset characteristic information is used as the offset compensation information. In the actual use of the system, offset compensation means calculates the inference value of an offset output corresponding to a measured value of the supply voltage, based on the measured value of the supply voltage and the supply voltage-offset characteristic information and compensates the output of the current sensor for the inference value of the offset output.

Further, where the steering shaft drive motor is operated under the PWM control, it is desirable to use current gain compensation information determined based on the output value of the current sensor and the output value of a reference current measuring system. In the foregoing embodiment, an output value of the reference current measuring system is measured based on a power supply voltage waveform which was made during the PWM control with a predetermined duty ratio. Since the voltage waveform made through the PWM control represents a rectangular waveform due to the intermittent application of an electric current, the waveform of the voltage across the current measuring resistance which voltage is input as a difference voltage to the differential amplifier circuit, represents a rectangular waveform with plural voltage changing edges as a matter of course. The substantial voltage level on the rectangular waveform is an average voltage level calculated by multiplying the duty ratio with the maximum voltage. When the current measurement is to be carried out with the supply voltage being fixed a certain value, it must be true that theoretically, no difference takes place in the results of the current measurements one of which is performed using the PMW waveform and the other of which is performed using a regular waveform corresponding to the average voltage. However, it can be concluded from the following two reasons that more precise current gain compensation information is prepared through the measurement using the voltage waveform made through the PWM control. ① The steering shaft drive motor is given an inductive load, wherein a flywheel current is generated due to switching on the PWM waveform, though no flywheel current is generated on the regular waveform. Accordingly, the contribution of the flywheel current does not reflect precisely in the current measurement made on the regular waveform. ② The PMW waveform includes plural voltage change edges. When these voltage change edges are input to the differential amplifier circuit, edges of the output waveform become dull more or less upon the influence of the throughrate. Contrary to this, the regular waveform is scarcely influenced by the throughrate. Accordingly, the influence of the throughrate on the differential amplifier circuit does not reflect precisely in the current measurement made on the regular waveform.

In the foregoing embodiment, the construction capable of compensating the output of the current sensor based on the offset compensation information is practiced in combination with the construction of compensating the output of the current sensor in dependence on the change in the power supply voltage. Where the both constructions are combined, the dispersions in the offset as well as in the gain of the current sensor outputs among the system products can both be restrained simultaneously, so that the advantages can be further enhanced. Further, where the differential amplifier circuit is constituted by the operational amplifier ICs, the effects of the foregoing embodiment can be enhanced remarkably because the characteristics of the operational amplifier ICs largely disperse among the same.

The vehicle steering control system according to the foregoing embodiment can be provided with motor operation restraining means for restraining the application of the electric current to the steering shaft drive motor in dependence upon the result in current detection by the current sensor. In this modified form of the embodiment, when the result in the current detection by the current sensor varies to represent the overcurrent of the steering shaft drive motor, the application of the electric current to the motor is controlled adequately to restrain the overheating of the motor or the like, because the preciseness in the current detection by the current sensor can be enhanced. As a result, the life of the motor can be elongated.

In addition, the handle shaft and the wheel steering shaft takes the configuration that they are separated mechanically. The lock mechanism used in the embodiment is capable of being switched between the lock state that the bosh shafts are locked and connected for bodily rotation and the unlock state that the lock state is released. With this arrangement, when the steering control as designed cannot be performed due to a trouble in the system, the handle shaft and the wheel steering shaft are locked and connected with each other, so that the manual steering without any power assist can be done to continue the driving of the vehicle. The motor operation restraining means is provided with lock control means for bringing the lock mechanism into the lock state and for discontinuing the operation of the steering shaft drive motor. When the current sensor gets out of order, the repair of the system becomes necessary. In this event, unless repaired, the current sensor cannot perform the current detection normally. Therefore, it is an effective counter measure to effect the switching to the manual steering by the handle wherein the handle shaft and the wheel steering shaft are locked and connected, and to let the steering shaft drive motor remain inoperative until the repair is completed.

Obviously, numerous modifications and variations of the present invention are possible in light of the above teachings. It is therefore to be understood that within the scope of the appended claims, the present invention may be practiced otherwise than as specifically described herein.

What is claimed is:

1. A vehicle steering control system for a vehicle wherein a steering angle to be given to a wheel steering shaft is determined in dependence on a steering angle given to a handle shaft for steering operation and a driving state of a vehicle so that said wheel steering shaft is rotationally driven by a steering shaft drive motor to be given said determined steering angle, said control system comprising:

a current sensor including a current detection resistance provided on a motor power supply path from a vehicle-mounted battery to a driver for said steering shaft drive motor for detecting a current applied to said steering shaft drive motor and a differential amplifier circuit for outputting a voltage across said current detection resistance as a current detection signal;

offset compensation information storage means for storing an offset compensation information used in offset-compensating an output of said current sensor, said offset compensation information being prepared based on a measuring value which is obtained, in advance of an actual use of said system, by measuring an offset output generated by said differential amplifier circuit when said voltage across said current detection resistance is zero; and offset compensation means for compensating the output of said current sensor based on said offset compensation information in the actual use of said system.

2. A steering control system as set forth in claim 1, further comprising power supply voltage measuring means for measuring a power supply voltage applied to said current detection resistance; and wherein:

said offset compensation information being power supply voltage dependent offset characteristic information prepared by measuring two or more power supply voltage levels which are set to be mutually different, in advance of the actual use of said system;

said offset compensation means being operable during the actual use of said system, for calculating an inference value of said offset output corresponding to said measuring value of said power supply voltage, based on said power supply voltage dependent offset characteristic information and for compensating the output of said current sensor with said calculated inference value of said offset output.

3. A steering control system as set forth in claim 1, further comprising:

current gain compensation information means for storing current gain compensation information for storing, in advance of the actual use of said system, current gain compensation information which is determined by the use of a group of the output value of said current sensor and the output value of a reference current measuring system, both of said output values being measured by applying a predetermined measuring power supply voltage to said current detection resistance; and current compensation means for compensating the output of said current sensor based on said current gain compensation information.

4. A vehicle steering control system for a vehicle wherein a steering angle to be given to a wheel steering shaft is determined in dependence on a steering angle given to a handle shaft for steering operation and a driving state of said vehicle so that said wheel steering shaft is rotationally driven by a steering shaft drive motor to be given said determined steering angle, said control system comprising:

a current sensor including a current detection resistance provided on a motor power supply path from a vehicle-mounted battery to a driver for said steering shaft drive motor for detecting a current applied to said steering shaft drive motor and a differential amplifier circuit for outputting a voltage across said current detection resistance as a current detection signal;

current gain compensation information storage means for storing current gain compensation information which is determined by a use of a group of an output value of said current sensor and an output value of a reference current measuring system, both of said output values being measured, in advance of an actual use of said system, by applying a predetermined measuring power supply voltage to said current detection resistance; and current compensation means for compensating the output of said current sensor based on said current gain compensation information.

5. A vehicle steering control system as set forth in claim 4, wherein:

said steering shaft drive motor is operable under PWM control; and said current gain compensation information is determined based on the output value of said current sensor and the output value of said reference current measuring system which is measured using a power supply waveform made under PWM control with a predetermined duty ratio.

6. A vehicle steering control system as set forth in claim 1, further comprising:

motor operation restraining means for restraining the current applied to said steering shaft drive motor, in dependence on a result of current detection by said current sensor.

7. A vehicle steering control system as set forth in claim 6, wherein:

said handle shaft and said wheel steering shaft are mechanically separated from each other;

a lock mechanism is further provided to be switchable between a locking state that said handle shaft and said wheel steering shaft are connected for bodily rotation and an unlocking state that said handle shaft and said wheel steering shaft are relieved from said locking state; and said motor operation restraining means includes locking control means for bringing said lock mechanism into said locking state and for stopping an operation of said steering shaft drive motor.

\* \* \* \* \*